(12) United States Patent
Ooiwa

(10) Patent No.: US 7,541,685 B2
(45) Date of Patent: Jun. 2, 2009

(54) VEHICLE-MOUNTED ALTERNATOR

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/230,071

(22) Filed: Aug. 22, 2008

(65) Prior Publication Data

US 2009/0085531 A1    Apr. 2, 2009

(30) Foreign Application Priority Data

Sep. 27, 2007    (JP) ............... 2007-250453

(51) Int. Cl.
*F02N 11/04*    (2006.01)
(52) U.S. Cl. .............. 290/31; 290/40 C; 290/36 R; 322/25; 322/28
(58) Field of Classification Search .............. 290/31, 290/40 C, 36 R; 322/28, 25
See application file for complete search history.

(56) References Cited

U.S. PATENT DOCUMENTS

| 5,122,705 | A  | 6/1992 | Kusase et al. |
| 6,424,073 | B1 | 7/2002 | Kometani et al. |
| 6,433,456 | B1 | 8/2002 | Higashino et al. |
| 7,402,916 | B2 * | 7/2008 | Taspinar et al. ............ 290/22 |

FOREIGN PATENT DOCUMENTS

| JP | A-04-026345   | 1/1992 |
| JP | A-2001-238374 | 8/2001 |
| JP | A-2004-274992 | 9/2004 |

* cited by examiner

*Primary Examiner*—Nicholas Ponomarenko
*Assistant Examiner*—Iraj A Mohandesi
(74) *Attorney, Agent, or Firm*—Oliff & Berridge, PLC

(57) ABSTRACT

The stator of the vehicle-mounted alternator includes a stator core formed with a plurality of slots located along a circumferential direction thereof, and first and second multi-phase windings wound in the slots, the first and second multi-phase windings being spaced from each other by a predetermined electrical angle. An output of the first multi-phase winding is rectified by a first rectifier device, and an output of the second multi-phase winding is rectified by a second rectifier device. The second rectifier device is constituted by a plurality of switching devices. The vehicle-mounted alternator includes a control device to perform on/off control on the switching devices such that a phase angle difference between an output of the first rectifier device and an output of the second rectifier device is varied depending on a rotation speed of the stator.

6 Claims, 5 Drawing Sheets

US 7,541,685 B2

VEHICLE-MOUNTED ALTERNATOR

CROSS-REFERENCE TO RELATED APPLICATION

This application is related to Japanese Patent Application No. 2007-250453 filed on Sep. 27, 2007, the contents of which are hereby incorporated by reference.

BACKGROUND OF THE INVENTION

1. Field of the Invention

The present invention relates to an alternator mounted on a vehicle such as a passenger car or a truck.

2. Description of Related Art

In recent years, there has been an increasing demand for vehicle alternators driven by an engine mounted on a vehicle, which generate less magnetic noise when generating power, in order to contribute to upgrading the vehicle. However, on the other hand, there has been an increasing demand for vehicle alternators having high power generation capacity because of an increase of electrical load due to an increased number of safety control devices and the like mounted on the vehicle. Accordingly, it has been required to provide small-sized, low-noise, and high-output vehicle alternators at a lower cost.

To address such requirements, various methods for reducing magnetic noise of a vehicle alternator have been proposed. For example, Japanese Patent Application Laid-open No. 4-26345 describes a structure in which two sets of three-phase windings are disposed spaced by an electrical angle of 30 degrees. This structure aims to reduce magnetic noise due to the sixth harmonic of a magnetomotive force of the stator. On the other hand, Japanese Patent Application Laid-open No. 2001-238374 describes a structure in which two sets of three-phase windings are provided such that their phase coils are located at alternate intervals of an electrical angle of 32.5 degrees and 27.5 degrees. This structure aims to remove the drawback of the structure disclosed in the above Japanese Patent Application Laid-open No. 4-26345 that although the sixth harmonic of the magnetomotive force can be reduced, the twelfth harmonic of the magnetomotive force increases.

One of the structures described in the former patent document and the structure described in the latter patent document can be selected in accordance with use conditions of an alternator. That is, when the sixth harmonic of the magnetomotive force is the only issue, it is appropriate to use the structure described in the former patent document. On the other hand, when the twelfth harmonic of the magnetomotive force is significantly large, it is appropriate to use the structure described in the latter patent document. The use conditions which make such a difference include a resonance frequency of an alternator mounting structure, and a rotation speed of an alternator.

It may occur to take a scheme of determining the electrical angle between two adjacent phase coils in between the electrical angles shown in these patent documents depending on the rigidities of an engine and an alternator mounting structure, etc. However, since it is desirable to standardize the shape and size of a stator core from a production view point, it is difficult to implement such a scheme. In addition, since the frequency at which magnetic noise can be reduced (or cannot be reduced) varies depending on a rotation speed of an engine, it is impossible to use an alternator driven by the engine always in an optimum state.

SUMMARY OF THE INVENTION

The present invention provides a vehicle-mounted alternator comprising:

a rotor having a plurality of magnetic poles;

a stator including a stator core disposed opposite to the rotor and formed with a plurality of slots located along a circumferential direction thereof, first and second multi-phase windings wound in the slots, the first and second multi-phase windings being spaced from each other by a predetermined electrical angle;

a first rectifier device rectifying an output of the first multi-phase winding; and a second rectifier device rectifying an output of the second multi-phase winding;

the second rectifier device being constituted by a plurality of switching devices, the vehicle-mounted alternator further comprising a control device to perform on/off control on the switching devices such that a phase angle difference between an output of the first rectifier device and an output of the second rectifier device is varied depending on predetermined conditions.

According to the present invention, it is possible to provide a vehicle-mounted alternator having a capability of effectively reducing magnetic noise thereof in accordance with a resonance frequency of a mounting structure thereof, and a rotation speed of a rotor thereof.

Other advantages and features of the invention will become apparent from the following description including the drawings and claims.

PREFERRED EMBODIMENTS OF THE INVENTION

Figure 1:
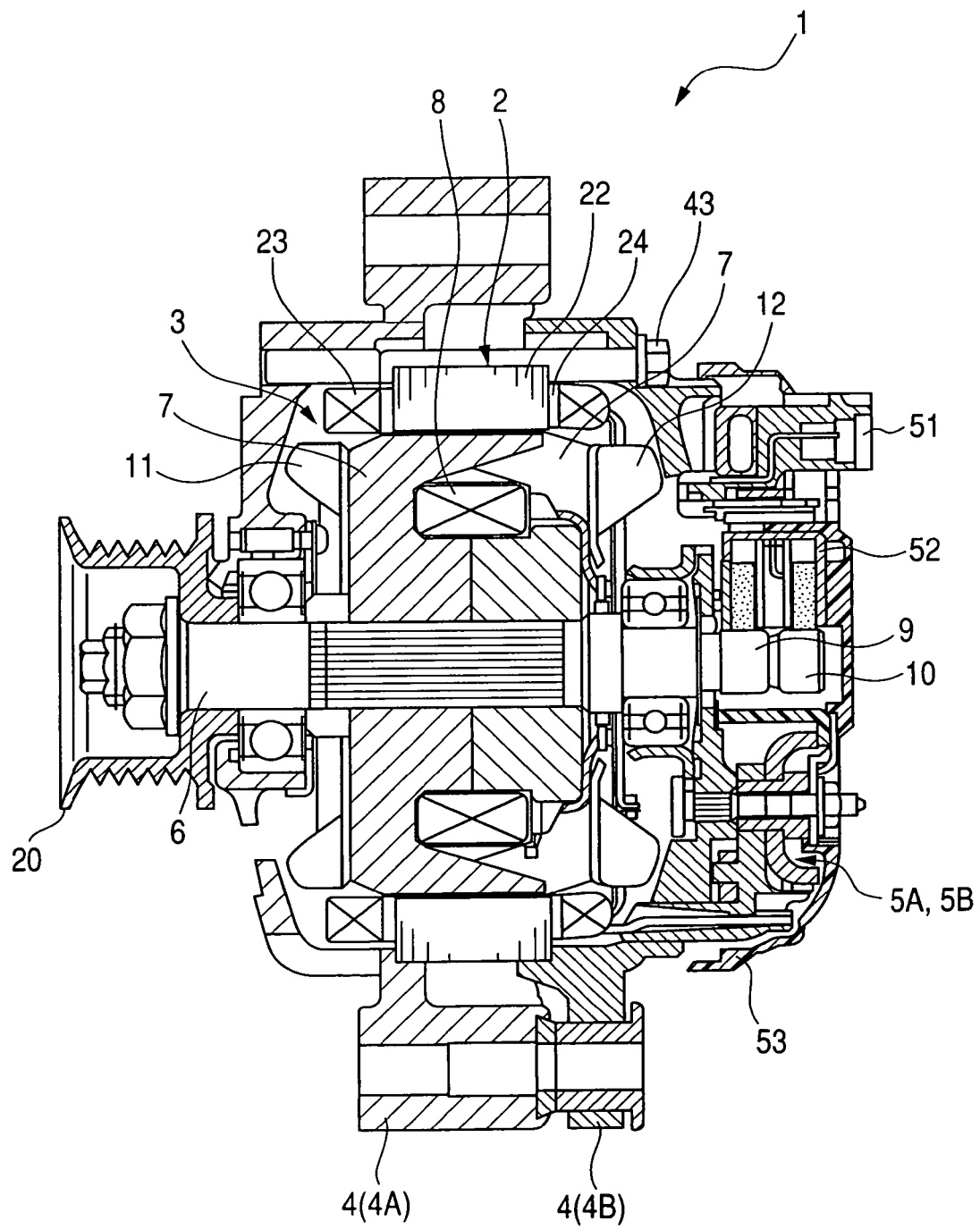
FIG. 1 is a diagram showing an overall structure of a vehicle-mounted alternator according to an embodiment of the invention.

FIG. 1 is a diagram showing an overall structure of a vehicle-mounted alternator 1 according to an embodiment of the invention. The alternator includes a stator 2, a rotor 3, a frame 4, a first rectifier device 5A, a second rectifier device 5B, and a regulator 51.

The stator 2 is constituted by a stator core 22, a stator winding 23 wound around the stator core 22, and an insulator 24 providing electrical insulation between the stator core 22 and the stator winding 23. The stator core 22, which is formed by laminating thin steel plates, has a plurality of (72 in this embodiment) slots formed in an inner periphery thereof.

The stator winding 23 is constituted by a first three-phase winding 23A and a second three-phase winding 23B. The details of the first and second three-phase windings 23A and 23B will be explained later.

The rotor 3, which rotates together with a shaft 6, includes a Lundell-type pole core 7, a rotor winding 8 as a field coil, slip rings 9 and 10, a diagonal fan 11, and a centrifugal fan 12. The shaft 6, which is coupled to a pulley 20, is driven to rotate by a vehicle engine (not shown). In this embodiment, the number of rotor poles is 8, and every four of the slots of the stator core 22 are located in an angular range of one magnetic pole pitch.

The frame 4 houses the stator 2 and the rotor 3 such that the rotor 3 is supported so as to be rotatable around the shaft 6, and the stator 2 is fixedly located around the outer periphery of the pole cores 7 of the rotor 3 with a predetermined gap therebetween. The frame 4 is constituted by a front frame 4A and a rear flame 4B which are joined by joint bolts 43 so as to support the stator 2. The details of the first and second rectifier devices 5A and 5B, and the regulator 51 will be explained later.

In the alternator 1 having the above described structure, the rotor 3 rotates in a predetermined direction when torque is transmitted from the engine to the pulley 20 through a belt or the like. In this state, when an excitation voltage is applied to the rotor winding 8, claw-like poles of the pole cores 7 are energized. As a result, three-phase AC voltages are induced in the stator winding 23, and DC powers are taken out from the first and second rectifier devices 5A and 5B.

Figure 2:
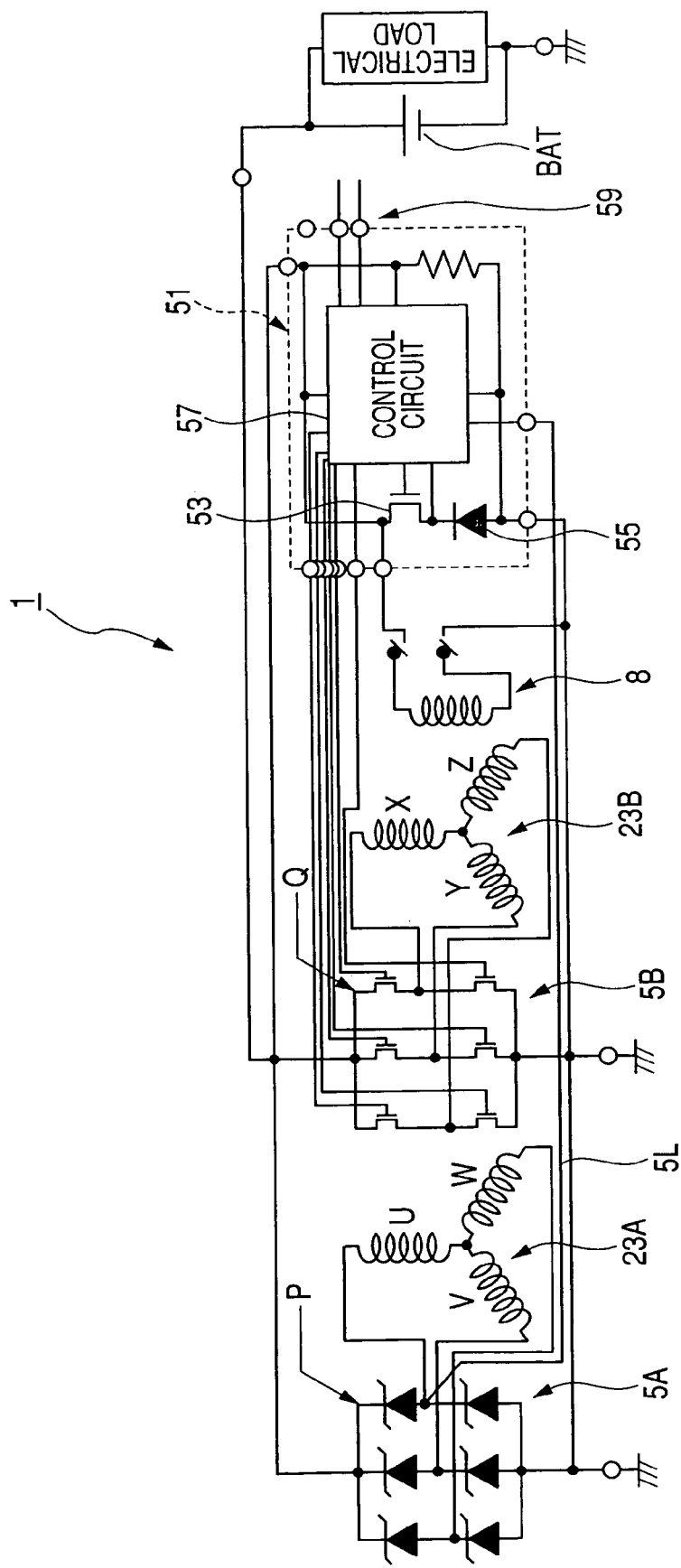
FIG. 2 is a diagram showing an electrical structure of the alternator.
Figure 3:
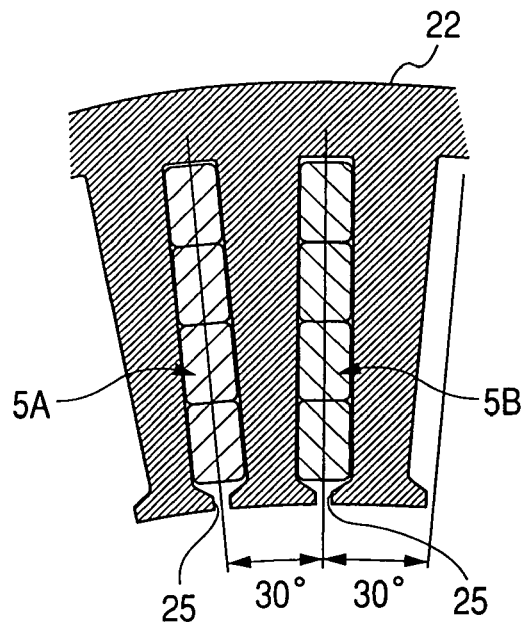
FIG. 3 is a partial cross-sectional view of a stator core of a stator of the alternator shown in FIG. 1, showing how first and second star-connected three-phase windings of the alternator are arranged in slots regularly spaced by an electrical angle of 30 degrees of the stator core.

Next, the electrical circuit structure of the alternator 1 is explained with reference to FIG. 2. FIG. 2 shows, in addition to the electrical circuit structure of the alternator 1, connection states with a battery BT and an electrical load. FIG. 3 is a partial cross-sectional view of the stator core 22 showing how phase coils of the first and second three-phase windings 23A and 23B are arranged in the slots 25 of the stator core 22.

As shown in FIG. 2, the alternator 1 includes the first and second three-phase windings 23A and 23B, the first rectifier device 5A connected to the first three-phase windings 23A, the second rectifier device 5B connected to the second three-phase windings 23B, the rotor winding 8 wound around the rotor 3, and the regulator 51 for regulating an output voltage of the alternator 1.

The first three-phase winding 23A is constituted by three phase coils spaced from one another by an electrical angle of 120 degrees and Y-connected to one another. As shown in FIG. 3, the phase coils of the first three-phase winding 23A are arranged in first ones of the slots 25.

The second three-phase winding 23B is constituted by three phase coils spaced from one another by an electrical angle of 120 degrees and Y-connected to one another. As shown in FIG. 3, the phase coils of the second three-phase winding 23B are arranged in second ones of the slots 25. The adjacent first and second slots 25 are spaced from each other by an electrical angle $\theta$ (=30 degrees). The electrical angle theta may be referred to as a "slot phase angle" in the following explanation.

The first rectifier device 5A, which is for full-wave rectifying the three-phase output of the first three-phase winding 23A, is constituted by six zener diodes.

The second rectifier device 5B, which is for full-wave rectifying the three-phase output of the second three-phase winding 23B, is constituted by six MOSFETs serving as switching devices. These MOSFETs are on/off controlled by a control circuit (microcomputer) 57 of the regulator 51 in order to full-wave rectify the three-phase output of the second three-phase winding 23B.

The regulator 51 includes a power transistor 53 series-connected to the rotor winding 8 for passing or interrupting the field current, a flywheel diode 55 parallel-connected to the rotor winding 8 which reduces the surge voltage occurring when the power transistor 53 is turned off, the control circuit 57 which controls a power generation state of the alternator 1 by monitoring an on/off state of a key switch, a terminal voltage of the battery BAT, etc. on the basis of a voltage of a not shown IG terminal or an S terminal of the alternator 1, and external terminals 59. The control circuit 57 is connected with a first coil-phase detection line 5L connected to a lead of the U-phase coil of the first three-phase winding 23A in the first rectifier device 5A. The control circuit 57 detects an output voltage phase of the first three-phase winding 23A corresponding to an rotation phase angle of the rotor 3 on the basis of a signal inputted through the first coil-phase detection line 5L.

Figure 4:
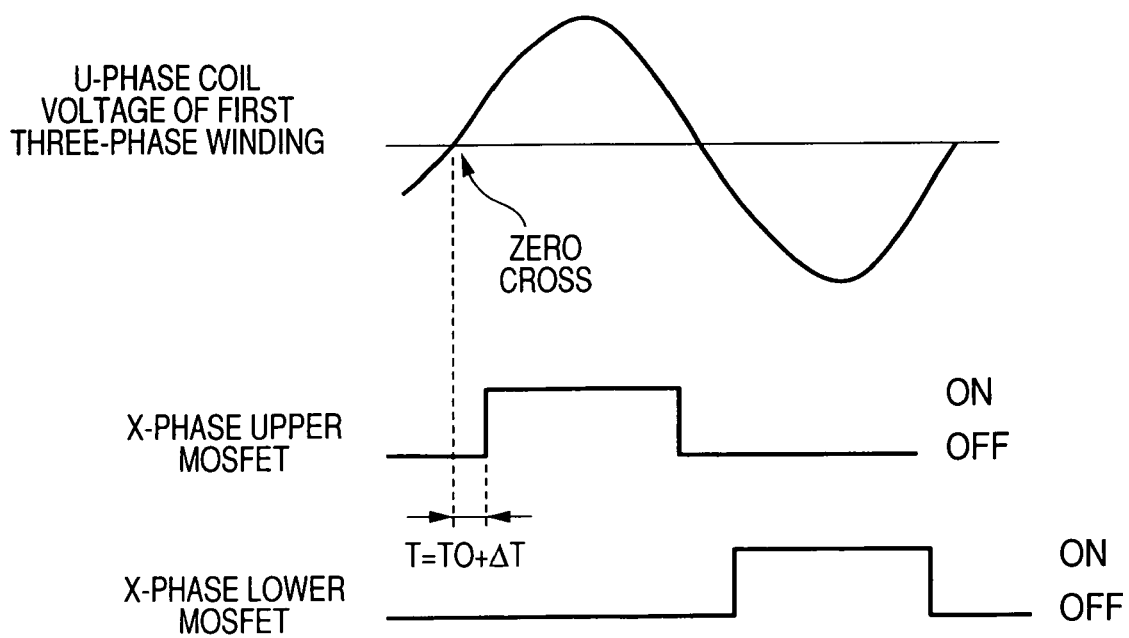
FIG. 4 is a timing chart showing a zero-cross detection timing of a U-phase voltage of the first three-phase winding, and on/off timings of an upper one and a lower one of two series-connected MOSFETs of a second rectifier device of the alternator, a connection node therebetween being connected to a lead of an X-phase coil of the first three-phase winding.

Next, the on/off control on the MOSFETs of the second rectifier device 5B performed by the control circuit 57 is explained. FIG. 4 is a timing chart showing a zero-cross detection timing of the U-phase voltage of the first three-phase winding 23A, and on/off timings of an upper one and a lower one of the two series-connected MOSFETs a connection node therebetween being connected to a lead of the X-phase coil of the second three-phase winding 23B. In the following explanation, these two MOSFETs may be referred to as "X-phase upper MOSFET" and "X-phase lower MOSFET", respectively. The control circuit 57 adjusts the on/off timings of the MOSFETs of the second rectifier device 5B, so that a phase angle difference $\delta$ between one of the U-, V-, and W-phase currents of the first three-phase winding 23A and a corresponding one of the X-, Y-, and Z-phase currents of the second three-phase winding 23B can be varied within a range of 25 to 35 degrees.

To this end, the control circuit 57 turns on the X-phase upper MOSFET of the second rectifier device 5B after an elapse of a predetermined time T after detecting a zero cross from negative to positive of the U-phase voltage of the first three-phase winding 23A on the basis of the input signal from the first coil-phase detection line 5L, and turns off the X-phase upper MOSFET after an elapse of a time period corresponding to an electrical angle of 180 degrees after turning it on. After an elapse of the predetermined time T after the X-phase upper MOSFET is turned off, the control circuit 57 turns on the X-phase lower MOSFET, and turns off this X-phase lower MOSFET after an elapse of a time period corresponding to an electrical angle of 180 degrees after turning it on.

In this embodiment, the predetermined time T can be expressed as T=T0+ΔT, where T0 is a fixed reference value, and ΔT is an adjusting quantity varying depending on the rotation speed of the rotor 3.

The reference value T0 is set to such a value that the phase angle difference δ representing the output current of the first rectifier device 5A and the output current of the second rectifier device 5B becomes equal to the slot phase angle θ of 30 degrees when the adjusting quantity ΔT is zero.

The adjusting quantity ΔT, which is for making the phase angle difference delta equal to a desired value, is set in accordance with a resonance frequency of a mounting structure of the alternator 1 and the rotation speed of the rotor 3. The rotation speed of the rotor 3 can be calculated by counting zero crosses of the U-phase voltage of the first three-phase winding 23A detected on the basis of the input signal from the first coil-phase detection line 5L. For example, when the rotor 3 is an eight-pole rotor, eight zero crosses from negative to positive corresponds to one-third of one rotation of the rotor 3.

For example, in the case where the resonance frequency of the mounting structure of the alternator 1 is 4.8 kHz, an optimum relationship between the rotation speed of the rotor 3 and the phase angle difference δ can be determined as follows. When the resonance frequency of the mounting structure of the alternator 1 is f Hz, the number of poles of the rotor 3 is N, the rotation speed of the rotor 3 is R rpm, and the order of the harmonic of the magnetomotive force is 6x, the equation of f=N×(R/60)×6x holds. By substituting N=8 and f=4800 in this equation, the equation of R=6000/x can be obtained. When x=1, (that is, when 6x=6), since R is obtained as 6000 rpm, it can be judged that the sixth harmonic becomes significant when the rotation speed of the rotor 3 is 6000 rpm. Accordingly, when the rotation speed of the rotor 3 is 6000 rpm, it is preferable to set the phase angle difference delta to 30 degrees to effectively suppress magnetic noise. When x=2, (that is, when 6x=12), since R is obtained as 3000 rpm, it can be judged that the twelfth harmonic becomes significant when the rotation speed of the rotor 3 is 3000 rpm. Accordingly, when the rotation speed of the rotor 3 is 3000 rpm, it is preferable to set the phase angle difference δ to 32.5 degrees to effectively suppress magnetic noise.

Figure 5A:
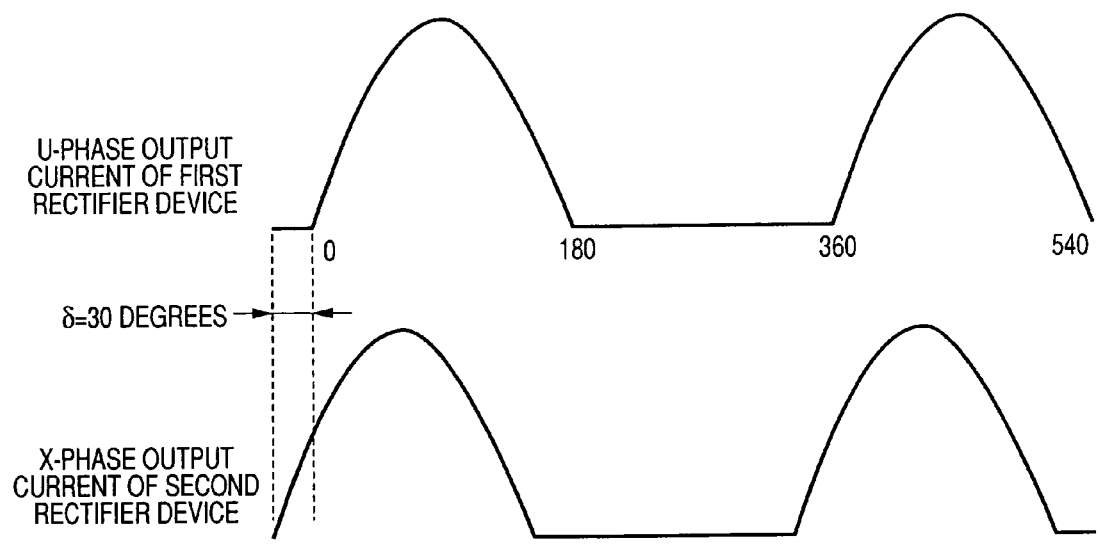
FIG. 5A is a diagram showing an output current over time of the U-phase coil in the first rectifier device, when a phase angle difference between the first and second rectifier devices is 30 degrees.
Figure 5B:
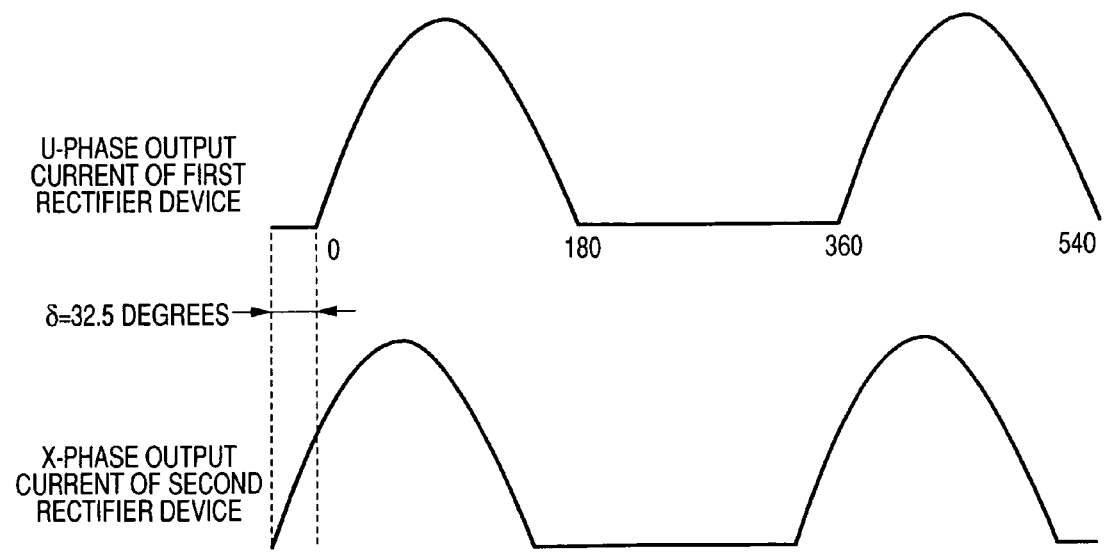
FIG. 5B is a diagram showing the output current over time of the U-phase coil in the first rectifier device, when a phase angle difference between the first and second rectifier devices is 32.5 degrees.

Hence, when the rotation speed of the rotor 3 is 6000 rpm, the adjusting quantity ΔT is set to zero in order to make the phase angle difference δ equal to 30 degrees to thereby suppress the sixth harmonic of the magnetomotive force. On the other hand, when the rotation speed of the rotor 3 is 3000 rpm, the adjusting quantity ΔT is set to T1 in order to make the phase angle difference δ equal to 32.5 degrees, to thereby suppress the twelfth harmonic of the magnetomotive force. FIG. 5A is a diagram showing an ideal target curve of the output current over time of the U-phase coil in the first rectifier device 5A when the phase angle difference δ is 30 degrees (when the rotation speed of the rotor 3 is 6000 rpm). FIG. 5B is a diagram showing an ideal target curve of the output current over time of the U-phase coil in the first rectifier device 5A when the phase angle difference δ is 32.5 degrees (when the rotation speed of the rotor 3 is 3000 rpm). In FIG. 2, the reference letter P shows a point at which the output current of the U-phase coil shown in FIG. 5A is measured, and Q shows a point at which the output current of the U-phase coil shown in FIG. 5B is measured. In this embodiment, a ROM included in the microcomputer constituting the control circuit 57 stores a data table showing the relationship between the rotation speed of the rotor 3 and the adjusting quantity ΔT, and a CPU of the microcomputer reads a value of the adjusting quantity ΔT corresponding to the rotation speed of the rotor 3 from the data table to calculate the predetermined time T (=T0+ΔT) while the CPU performs the on/off control on the MOSFETs of the second rectifier device 5B. For the rotation speed of the rotor 3 not equal to either 6000 rpm or 3000 rpm, the adjusting quantity ΔT is set to zero when it is closer to 6000 rpm than 3000 rpm, while on the other hand, the adjusting quantity ΔT is set to T1 when it is closer to 3000 rpm than 6000 rpm. It should be noted that each phase current does not actually vary along a strict sine curve, since when on timings of the switching devices are shifted, the electro motive force varies, and according, the waveform thereof is distorted.

As apparent from the above description, according to this embodiment, since the second rectifier device 5B is constituted by a plurality of switching devices (MOSFETs), and the control circuit 57 devices varies the phase angle difference δ between the output current of the first rectifier device 5A and the output current of the second rectifier device 5B by adjusting the on/off timings of these switching devices, it is possible to effectively reduce the magnetic noise which depends on the resonance frequency of the alternator mounting structure, and the rotation speed of the rotor 3.

In particular, since the control circuit 57 varies the phase angle difference delta in accordance with the rotation speed of the rotor 3 in order to reduce a specific harmonic component which is a main cause of the magnetic noise, the magnetic noise can be effectively reduced for any rotation speed of the rotor 3.

Each of the first three-phase winding 23A and the second three-phase winding 23B is constituted by three phase coils spaced by an electrical angle of 120 degrees from one another, and the phase coils of the first three phase winding 23A and the phase coils of the second three-phase winding 23B are arranged in every other slots 25 in an alternative manner. Accordingly, it is possible to vary the phase angle difference δ to a desired value by finely adjusting the on/off timings of the switching devices of the second rectifier device 5B by the adjusting quantity ΔT stored in the ROM of the microcomputer.

The positional difference θ in electrical angle between the first and second three-phase windings 23A and 23B is set at 30 degrees, and the control circuit 57 varies the phase angle difference δ within a range of 25 to 35 degrees. This makes it possible that, when the main cause of the magnetic noise is sixth harmonic of the magnetomotive force, the control circuit 57 sets the phase angle difference δ to 30 degrees to suppress the sixth harmonic, and when the main cause of the magnetic noise is twelfth harmonic of the magnetomotive force, the control circuit 57 sets the phase angle difference δ to 32.5 degrees to suppress the twelfth harmonic. This effectively suppresses the magnetic noise.

The first rectifier device 5A is constituted by a plurality of diodes less expensive compared to switching devices (MOSFETs) which need to be on/off controlled. This makes it possible to provide the vehicle-mounted alternator 1 at a lower cost. The phase of the signal outputted from the first coil-phase detection line 5L corresponds to the phase angle of the rotor 3. Accordingly, it is possible for the control circuit 57 to reliably on/off control the switching devices of the second rectifier device 23B in accordance with the signal outputted from the first coil-phase detection line 5L without requiring any specific phase angle detection device to detect the phase angle of the rotor 3.

It is a matter of course that various modifications can be made to the above described embodiment.

Figure 6:
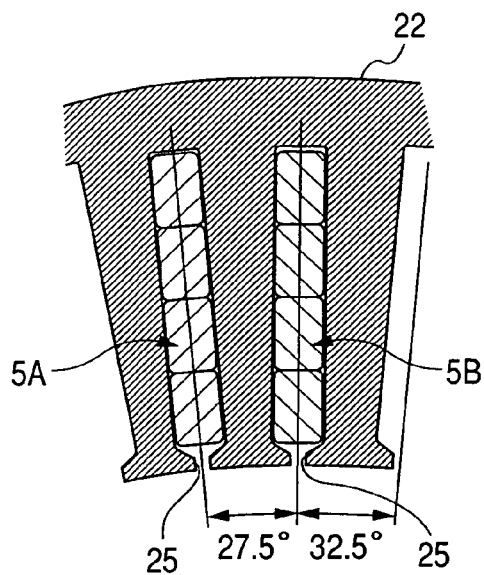
FIG. 6 is a partial cross-sectional view of a stator core of a stator of a variant of the alternator, showing that the phase coils of the first three-phase winding and the phase coils of the second three-phase winding are arranged in every other slots in an alternate manner, the slots being spaced at alternate intervals of an electrical angle of 32.5 degrees and 27.5 degrees.

For example, in the above embodiment, the phase coils of the first three-phase winding 23A and the phase coils of the second three-phase winding 23B are arranged in every other slots 25 in an alternate manner, the slots 25 being regularly spaced by 30 degrees. However, as shown in FIG. 6, the embodiment may be so modified that the phase coils of the first three-phase winding 23A and the phase coils of the second three-phase winding 23B are arranged in every other slots 25 in an alternate manner, the slots 25 being spaced at alternate intervals of an electrical angle of 32.5 degrees and 27.5 degrees.

Figure 7:
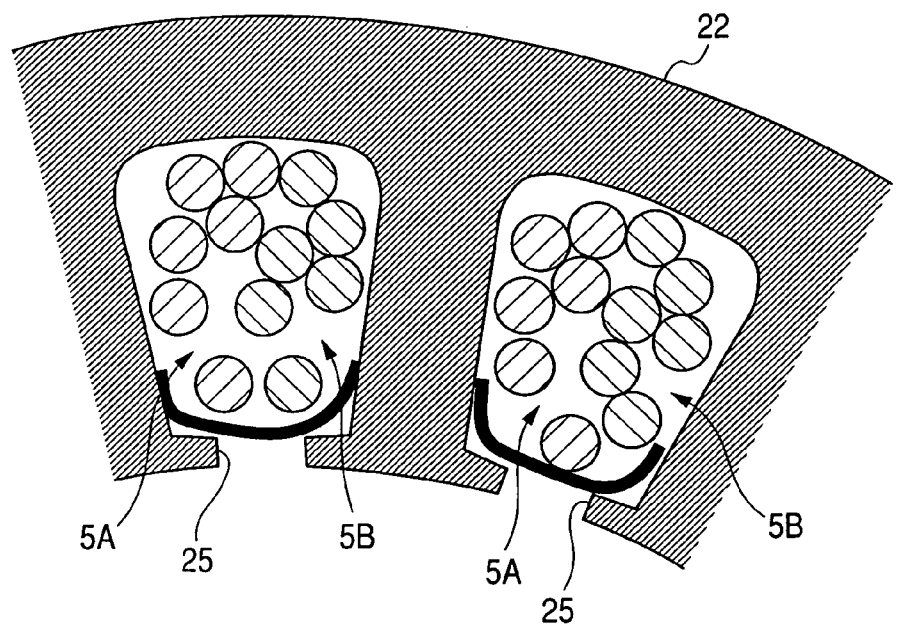
FIG. 7 is a partial cross-sectional view of a stator core of a stator of a variant of the alternator, showing that the phase coils of the first three-phase winding and the phase coils of the second three-phase winding are arranged in the same slots.

Furthermore, the embodiment may be so configured that the phase coils of the first three-phase winding 23A and the phase coils of the second three-phase winding 23B are arranged in the same slots 25 as shown in FIG. 7. According to this configuration, the winding structure of the stator 2 can be simplified. In addition, if the control circuit 57 varies the phase angle difference delta within a range of 25 to 35 degrees to advance the current phase with respect to the voltage phase, a high output can be obtained.

Figure 8:
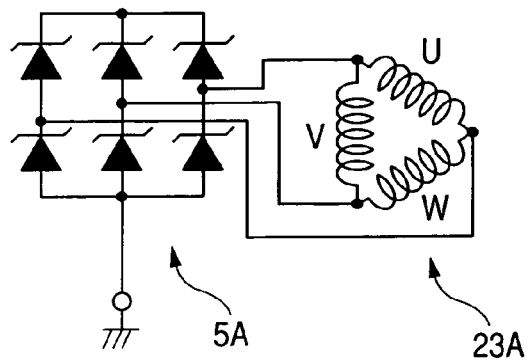
FIG. 8 is a diagram showing an electrical connection diagram of a first delta-connected three-phase winding of a variant of the alternator.

In the above embodiment, the first and second three-phase windings 23A and 23B are delta-connected windings. However, they may be delta-connected windings as shown in FIG. 8.

In the above embodiment, the first rectifier device 5A is constituted by a plurality of diodes. However, it may be constituted by a plurality of switching devices such as MOSFETs as in the case of the second rectifier device 5B.

The above embodiment describes the case where the resonance frequency of the alternator mounting structure is 4.8 kHz. The following is an explanation of a case where the resonance frequency of the alternator mounting structure is 2.4 kHz. By substituting N=8 and f=2400 in the equation of $f=N \times (R/60) \times 6x$, the equation of $R=3000/x$ can be obtained. When x=1, (that is, when 6x=6), since R is obtained as 3000 rpm, it can be judged that the sixth harmonic becomes significant when the rotation speed of the rotor 3 is 3000 rpm. Accordingly, when the rotation speed of the rotor 3 is 3000 rpm, it is preferable to set the phase angle difference δ to 30 degrees to effectively suppress magnetic noise. When x=2, (that is, when 6x=12), since R is obtained as 1500 rpm, it can be judged that the twelfth harmonic becomes significant when the rotation speed of the rotor 3 is 1500 rpm. Accordingly, when the rotation speed of the rotor 3 is 1500 rpm, it is preferable to set the phase angle difference δ to 32.5 degrees to effectively suppress magnetic noise. A data table showing the relationship between the rotation speed of the rotor 3 and the adjusting quantity ΔT may be stored in the ROM included in the microcomputer constituting the control circuit 57.

The following is an explanation of a case where the resonance frequency of the alternator mounting structure is 9.6 kHz. By substituting N=8 and f=9600 in the equation of $f=N \times (R/60) \times 6x$, the equation of $R=12000/x$ can be obtained. When x=1, (that is, when 6x=6), since R is obtained as 12000 rpm, it can be judged that the sixth harmonic becomes significant when the rotation speed of the rotor 3 is 12000 rpm. Accordingly, when the rotation speed of the rotor 3 is 12000 rpm, it is preferable to set the phase angle difference δ to 30 degrees to effectively suppress magnetic noise. When x=2, (that is, when 6x=12), since R obtained as 6000 rpm, it can be judged that the twelfth harmonic becomes significant when the rotation speed of the rotor 3 is 6000 rpm. Accordingly, when the rotation speed of the rotor 3 is 6000 rpm, it is preferable to set the phase angle difference δ to 32.5 degrees to effectively suppress magnetic noise. A data table showing the relationship between the rotation speed of the rotor 3 and the adjusting quantity ΔT may be stored in the ROM included in the microcomputer constituting the control circuit 57.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-mounted alternator comprising:
a rotor having a plurality of magnetic poles;
a stator including a stator core disposed opposite to said rotor and formed with a plurality of slots located along a circumferential direction thereof, first and second multi-phase windings wound in said slots, said first and second multi-phase windings being spaced from each other by a predetermined electrical angle;
a first rectifier device rectifying an output of said first multi-phase winding; and
a second rectifier device rectifying an output of said second multi-phase winding;
said second rectifier device being constituted by a plurality of switching devices,
said vehicle-mounted alternator further comprising a control device to perform on/off control on said switching devices such that a phase angle difference between an output of said first rectifier device and an output of said second rectifier device is varied depending on predetermined conditions.

2. The vehicle-mounted alternator according to claim 1, wherein said predetermined conditions include a rotation speed of said stator.

3. The vehicle-mounted alternator according to claim 1, wherein each of said first and second multi-phase windings is a three-phase winding constituted by three phase coils connected to one another, said first and second multi-phase windings being spaced from each other by an electrical angle of 120 degrees, said phase coils of said first multi-phase winding and said phase coils of said second multi-phase winding being arranged in every other slots of said stator core in an alternate manner.

4. The vehicle-mounted alternator according to claim 3, wherein said control device varies said phase angle difference within a range of 25 degrees to 35 degrees.

5. The vehicle-mounted alternator according to claim 1, wherein each of said first and second multi-phase windings is a three-phase winding constituted by three phase coils connected to one another, said first and second multi-phase windings being spaced from each other by an electrical angle of 120 degrees, said phase coils of said first multi-phase winding and said phase coils of said second multi-phase winding being arranged in the same slots of said stator core, said control device varying said phase angle difference within a range of 25 degrees to 35 degrees.

6. The vehicle-mounted alternator according to claim 1, wherein said first rectifier device is constituted by a plurality of diodes, and said control device includes a phase detection function of detecting a phase of said output of said first multi-phase winding, said control device being configured to on/off control said switching devices of said second switching devices in accordance with said phase of said output of said first multi-phase winding detected by said phase detection function.

* * * * *